US006954320B2

(12) United States Patent
Yang

(10) Patent No.: US 6,954,320 B2
(45) Date of Patent: Oct. 11, 2005

(54) METHOD AND APPARATUS FOR DETERMINING DISK DRIVE PARAMETER IN ACCORDANCE WITH AMBIENT TEMPERATURE

(75) Inventor: Won-choul Yang, Gwangju (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 419 days.

(21) Appl. No.: 10/072,889

(22) Filed: Feb. 12, 2002

(65) Prior Publication Data

US 2002/0114092 A1 Aug. 22, 2002

(30) Foreign Application Priority Data

Feb. 19, 2001 (KR) .......................................... 2001-8138

(51) Int. Cl.[7] .............................................. G11B 5/09
(52) U.S. Cl. .............................. 360/46; 360/31; 360/69
(58) Field of Search ............................ 360/31, 46, 66, 360/69

(56) References Cited

U.S. PATENT DOCUMENTS

| | | | |
|---|---|---|---|
| 3,753,254 A | | 8/1973 | Ruble et al. |
| 5,566,077 A | | 10/1996 | Kulakowski et al. |
| 5,808,438 A | | 9/1998 | Jeffrey |
| 5,978,163 A | * | 11/1999 | Cunningham ................. 360/66 |
| 6,078,455 A | * | 6/2000 | Enarson et al. ............... 360/68 |
| 6,088,662 A | | 7/2000 | Flinsbaugh et al. |
| 6,124,998 A | | 9/2000 | Kanegae |
| 6,229,275 B1 | | 5/2001 | Yamamoto |
| 6,266,203 B1 | * | 7/2001 | Street et al. ................... 360/69 |
| 6,504,797 B1 | | 1/2003 | Murakami et al. |
| 6,574,061 B1 | * | 6/2003 | Ling et al. ..................... 360/66 |
| 6,791,908 B2 | | 9/2004 | Murakami et al. |

FOREIGN PATENT DOCUMENTS

| | | | | |
|---|---|---|---|---|
| JP | 02187972 A | * | 7/1990 | ........... G11B/21/10 |
| JP | HEI 6-111457 | | 4/1994 | |
| JP | 10-340412 | | 12/1998 | |
| JP | HEI 10-340412 | | 12/1998 | |

OTHER PUBLICATIONS

"Notice to Submit Response" issued by Korean Intellectual Property Office dated on Oct. 24, 2002 and English language translation of the Notice to Subunit Response.
United Kingdom Patent Office's combined search and examination report No. GB 0125016.6 dated 17.

* cited by examiner

*Primary Examiner*—David Hudspeth
*Assistant Examiner*—Dan I Davidson
(74) *Attorney, Agent, or Firm*—Robert E. Bushnell, Esq.

(57) ABSTRACT

A hard disk drive and process of controlling the drive by adjusting disk drive parameters in accordance with ambient temperature. Various parameters affected by thermal variation are controlled to automatically adjust those values in order to compensate for changes in ambient temperature when an environment where a hard disk drive is installed changes, thereby allowing the hard disk drive to continuously operate with optimal performance. Those parameter, which are sensitive to the temperature of a hard disk drive, can be modified or controlled using the relationship therebetween in accordance with the current ambient temperature, thereby preventing any deterioration of the performance of the hard disk drive, even when temperature at the burn-in process and the current ambient temperature are different from each other.

17 Claims, 4 Drawing Sheets

METHOD AND APPARATUS FOR DETERMINING DISK DRIVE PARAMETER IN ACCORDANCE WITH AMBIENT TEMPERATURE

CLAIM OF PRIORITY

This application makes reference to, incorporates the same herein, and claims all benefits accruing under 35 U.S.C. §119 from my application entitled METHOD AND APPARATUS FOR DETERMINING PARAMETERS OF DISK DRIVE IN USER'S CONDITION filed with the Korean Industrial Property Office on 19 Feb. 2001 and there duly assigned Ser. No. 8138-2001.

BACKGROUND OF THE INVENTION

1. Field of the Invention

The present invention relates to a disk drive and a method of controlling the same and, more particularly, to a method and apparatus for determining disk drive parameters in accordance with ambient temperature.

2. Description of the Related Art

Generally, the features of a magneto-resistive write and read head for respectively recording and reproducing, information on a disk of a hard disk drive can be optimized by varying a variety of parameters affecting the performance of the hard disk drive during a burn-in process customarily performed during manufacture of the hard disk drive. That is, values of various parameters corresponding to a channel factor, which optimizes the features of read and write channels, are controlled during the burn-in process.

In a hard disk drive, changes in a head media signal as well as mechanical changes occur due to fluctuations of environmental conditions such as temperature that deleteriously affect the performance of the hard disk drive. For these reasons, I have found that there is a need to correct parameters of the hard disk drive in accordance with changes of temperature. In this regard, Japanese Laid-Open Patent Publication No. Hei 10-340412 discloses an information memory device capable of sensing variations in temperature and attempting to correct the write current to a predetermined value found in a look-up table.

I have found that changes in temperature below the ambient temperature result in changes in the flying height of a head, the magnetic coercive force of a disk, a rate of variation of the resistance of the magneto-resistive (MR) head and non-linear transmission shift (NLTS) of the head. In contemporary practice however, only one parameter of a hard disk drive, namely the write current, is corrected in accordance with variations in the temperature surrounding a hard disk drive; other parameters related to thermal change are maintained at fixed values. Therefore, it is difficult to obtain the optimum performance of the hard disk drive and thus the quality of the performance of the hard disk drive deteriorates.

SUMMARY OF THE INVENTION

It is therefore, an object of the present invention to provide an improved disk drive and process for controlling a hard disk drive.

It is another object to provide a hard disk drive and a process that compensate for variations in temperature of the hard disk drive.

It is still another object to provide a hard disk drive and a process that compensates for the affects of variations in temperature upon multiple parameters that influence the operation of the hard disk drive.

It is yet another object to provide a memory such as a hard disk drive and operational process that endeavors to continuously maintain those operational characteristics of the memory that may change as a result of ambient variations, at values that stabilize the performance of the memory to conform to its operational characteristics exhibited while the memory is exposed to ambient conditions within a critical range.

It is still yet another object to provide a method and apparatus for determining disk drive parameters in accordance with ambient temperature, and after determining the ambient temperature, to adjust those parameter values that are determined during a burn-in process and that are also affected by temperature to be compatible with the determined ambient temperature in consideration of changes in the performance of the hard disk drive attributable to temperature, thus allowing the hard disk drive to operate with optimum performance.

These and other objects may be achieved with a hard disk drive and a process for determining parameters of a hard disk drive that may be influenced by ambient temperature, by the expedient of updating temperature information by measuring the temperature in the disk drive during a predetermined mode. A determination is then made about whether the updated temperature information falls within a critical temperature range. Write and read parameters are designated as parameters that are affected by temperature in order to compensate for variations in the performance of the hard disk drive due to any excess temperature after considering the relationship of the write and read parameters and the thermal change, when the thermal information indicates that the updated temperature exceeds the critical temperature range.

These objects may also be achieved with a process and apparatus that determines parameters of a hard disk drive influenced by ambient temperature, that may be constructed with a memory storing information regarding a variety of parameters and the measured temperature of the disk drive. A temperature sensor senses the temperature in the disk drive, and a controller that updates temperature information detected by the temperature sensor in the memory during a predetermined operational mode, compares the updated temperature information and a critical temperature range, and changes write and read parameters that are affected by temperature, from among those parameters stored in the memory in order to compensate for variations in the performance of the disk drive in correspondence with the excess temperature, and in consideration of the relation between the read and write parameters and the thermal change, whenever the updated temperature rises above, or drops below, the critical temperature range.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE INVENTION

Figure 1:
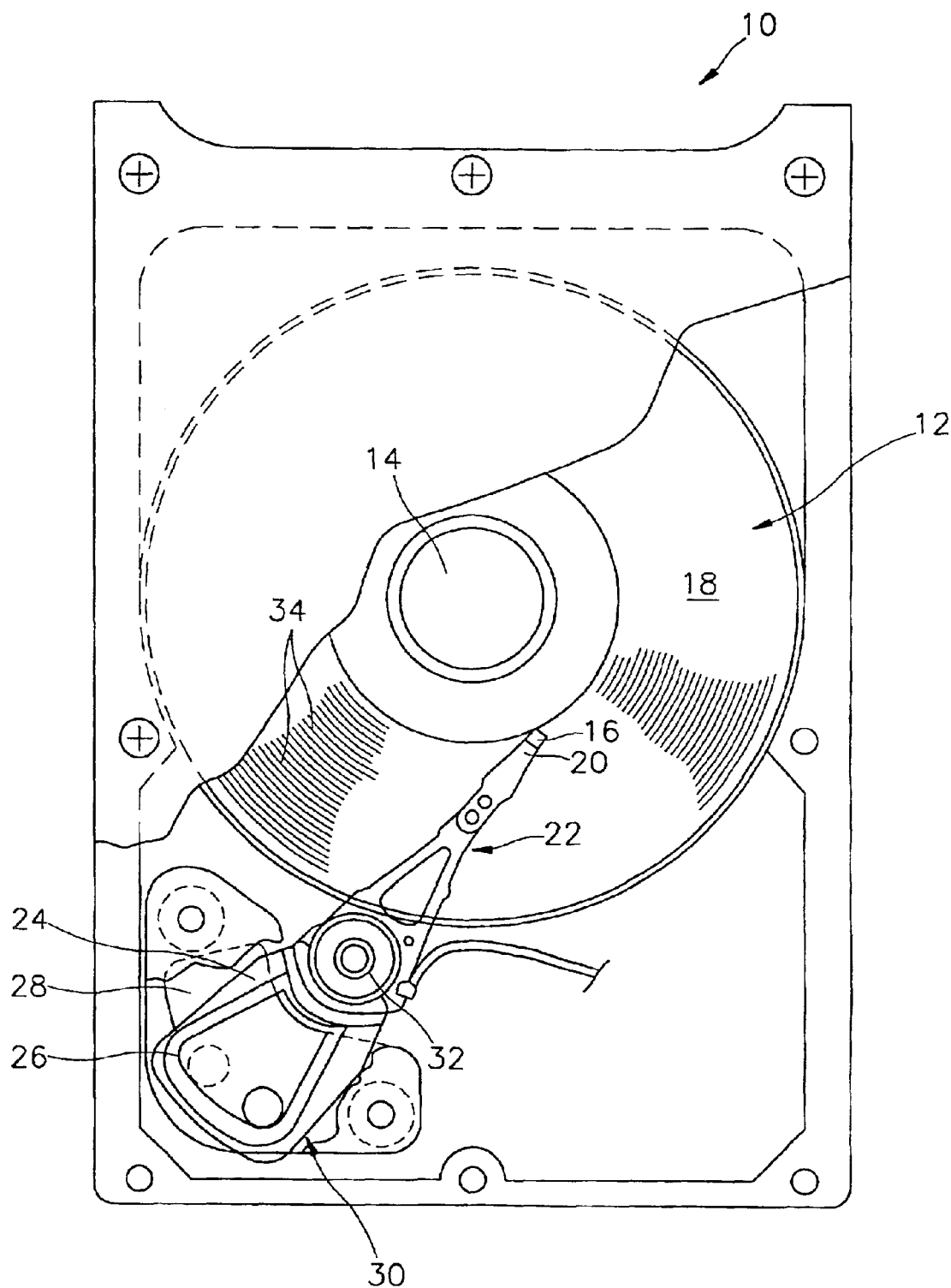
FIG. 1 is a plan view of a structure of a hard disk drive constructed according to the principles of the present invention.

Turning now to the drawings, FIG. 1 shows a structure of a hard disk drive 10 constructed according to the principles of the present invention. Hard disk drive 10 includes at least one and possibly a plurality of magnetic disks 12 that maybe rotated by a spindle motor 14 and a transducer 16 which is positioned near a corresponding planar surface 18 of disk 12.

Data and other information may be stored in the form of binary bits on surface 18 while spindle motor 14 rotates disk 18 around its axis. Transducer 16 reads or writes information on the rotating disk 12 by sensing and magnetizing a magnetic field borne by surface 18 of the disk 12. Here, although the transducer 16 is empirically described as a single body, it must be understood that a transducer may be constructed with two separate bodies, namely a write transducer for magnetizing the disk 12 and a read transducer for sensing the magnetic field borne by disk 12. The read transducer may be composed of a magneto-resistive (MR) device. Also, the transducer 16 may be configured to be included in a slider 20 mounted on the distal end of head gimbal assembly 22.

Slider 20 has a structure in which an air bearing is formed in the intermediate space between the transducer 16 and the disk surface 18 and is coupled with a head gimbal assembly 22. The head gimbal assembly 22 is attached to an actuator arm 24 that bears a voice coil 26 at its radially opposite end. Voice coil 26 is positioned near a magnet assembly 28 that is coupled with a voice coil motor (VCM) 30. An electrical current provided to the voice coil 26 generates a torque which rotates the actuator arm 24 about a bearing assembly 32, and the rotation of the actuator arm 24 causes the transducer 16 to move somewhat radially across disk surface 18.

Information is originally stored in a plurality of annular tracks 34 on surface 18 of the disk 12. Each of tracks 34 generally includes a plurality of sectors. Transducer 16 is moved by motor 30 across surface 18 to read information from or record information in the tracks.

Figure 2:
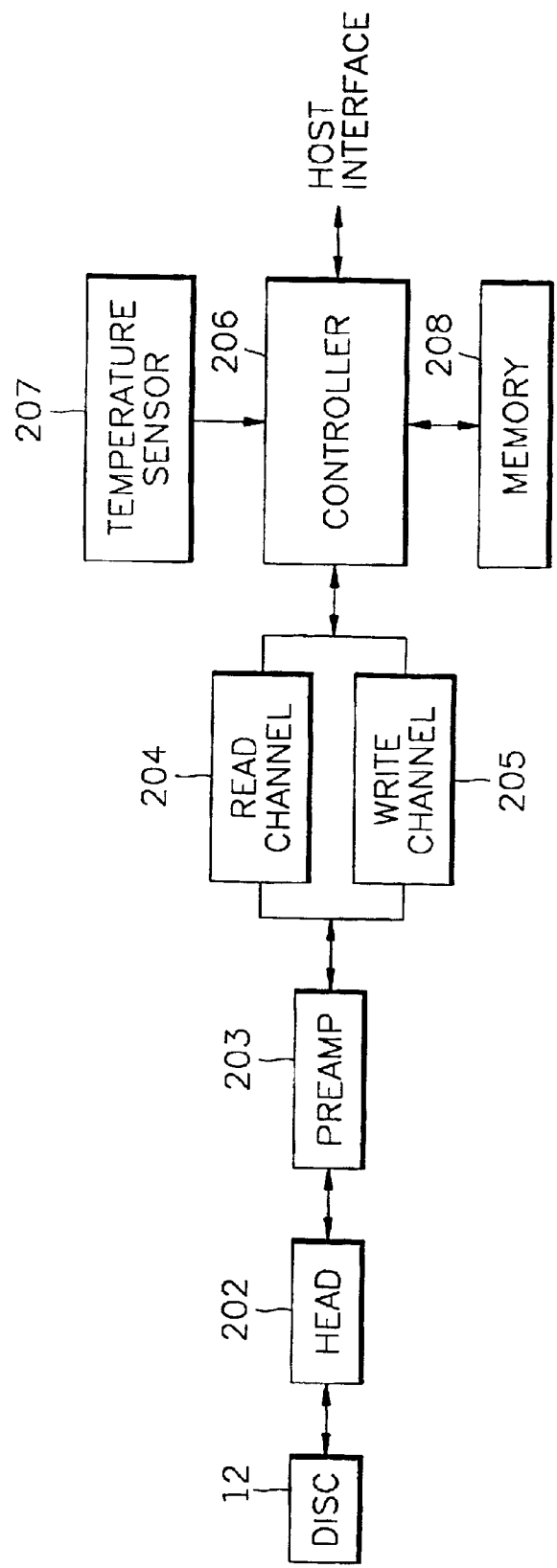
FIG. 2 is a schematic diagram illustrating an apparatus able to determine parameters of the disk drive in accordance with ambient temperature according to the principles of the present invention.

FIG. 2 shows an apparatus for determining disk drive parameters in accordance with ambient temperature. The apparatus includes a disk 12, a read and write head 202 being transducer 16, a preamp 203, a read channel 204, a write channel 205, a controller 206, a temperature sensor 207 and a memory 208 that are operatively interconnected as described below.

In the general operation of a hard disk drive, when data is read from the hard disk drive, a signal read by head 202 from disk 12 is amplified by preamp 203 so that the signal can be more faithfully signal-processed. Then the amplified analog signal is converted into a digital signal to be readable by a host computer (not shown) and the digital signal is transmitted to the host computer via a host interface. When data is written on disk 12 however, user data is received from the host computer via the host interface and is converted into an electric analog signal in write channel 205 and then a write current amplified by preamp 203 is recorded on disk 12 via MR head 202.

According to the method of determining disk drive parameters influenced by ambient temperature according to the present invention, the performance of a hard disk drive is in correspondence with the change of the ambient temperature of the hard disk drive. For instance, if ambient temperature changes from normal temperature to low temperature, the characteristic performance of several structural and operational features of the hard disk drive change, namely: (i) the epoxy used for binding a slider and a suspension contract, and as a result, the crown in the slider is increased, thus raising the flying height of the head; (ii) the magnetic coercive force ($H_c$) of disk 12 is increased to about 15 $H_c$/1° C.; (iii) variations in the resistance of an MR head 202 ($\Delta R/R$) are reduced; and (iv) the non-linear transmission shift (NLTS) of head 202 is changed. $H_c$ is a coercive force of the recording medium which increases as the ambient temperature decreases. When $H_c$ becomes too great, it is difficult to write data onto the recording medium. Note that in the ratio $\Delta R/R$, "R" is a resistance value of the MR head when an external magnetic field is not applied to the MR head. "$\Delta R$" corresponds to an amount of increase in the resistance of the MR head when a predetermined external magnetic field is applied in a reproduction mode. Since the value of $\Delta R$ varies according to the ambient temperatures its variation affects the reproduction process.

To correct such problems, according to the present invention, parameters are changed by using the following techniques. First, the length of a write booster is altered to compensate for variations in the flying height of head 202, the magnetic coercive force $H_c$ and non-linear transmission shift (NLTS) of head 202. That is, if the ambient temperature of a hard disk drive is decreased too much, the rise time of the write current may be reduced by altering the magnitude of the write booster. Second, a value for controlling a write precomp may be altered in order to compensate for variations in the flying height and non-linear transmission shift (NLTS) of head 202. Third, a read bias current value may be increased in order to compensate for variations in the resistance ($\Delta R/R$) of the MR head 202. Fourth, the amplitude of the write current value may be increased to compensate for variations in the flying height and magnetic coercive force of head 202.

In summary, to compensate for variations in the performance of the hard disk drive in response to thermal variation, parameters related to the read bias current factor and parameters for writing that include a write current determination factor, the write booster determination factor and the write precomp factor, are determined either empirically or based on experiments or statistics, so that the performance of the hard disk drive can be optimized in compensation for changes in the performance of the drive that are attributable to the thermal variation.

To achieve this result, memory 208 contains information regarding parameters for writing, which includes the write current determination factor, the write booster determination factor and the write precomp factor with respect to temperature change, and parameters for a read bias current factor, as well as information regarding parameters related to the operation of the hard disk drive, measured temperature and temperature used during the burn-in process. The parameters stored with their initial values in memory 208 are the optimum parameters that are determined during the burn-in process, which is one of the processes performed during the manufacture of hard disk drive 10.

Temperature sensor 207, a device for sensing the temperature in the hard disk drive, includes a temperature sensitive element, and generates temperature information corresponding to the sensed temperature value. "$T_{min}$" corresponds to a minimum critical temperature at which the parameter values set in the burn-in process need to be changed. "$T_{max}$" corresponds to a maximum critical temperature at which the parameter values set in the burn-in process need to be adjusted. "T" corresponds to the ambient temperature detected by sensor 207 under user conditions. "$T_0$" corresponds to a temperature of a place where the burn-in process is performed during the manufacture of disk 10. "$T_f$" corresponds to a temperature obtained by subtracting $T_0$, the temperature in the burn-in process, from T, an ambient temperature occurring under user conditions. $T_{min}$, $T_{max}$, and $T_0$ are obtained through experimentation.

Controller 206 updates memory 208 with the temperature information received from temperature sensor 207 while the disk drive 10 is in an idle mode during the power-on state, at regular intervals having a predetermined period, and compares the updated temperature information already stored in memory 208 with the critical temperature range established during the burn-in process. Thereafter, in the event that the updated temperature information exceeds the critical temperature range, controller 206 executes a routine process to change the values of those parameters for writing including the write current determination factor, the write booster determination factor and the write precomp factor, which are affected by thermal variation, to values that are compatible with the excess temperature.

Referring to the flowcharts shown in FIGS. 3 and 4, the operation of the apparatus shown in FIGS. 1 and 2 will be described together with the details of those processes according to the principles of the present invention.

Figure 3:
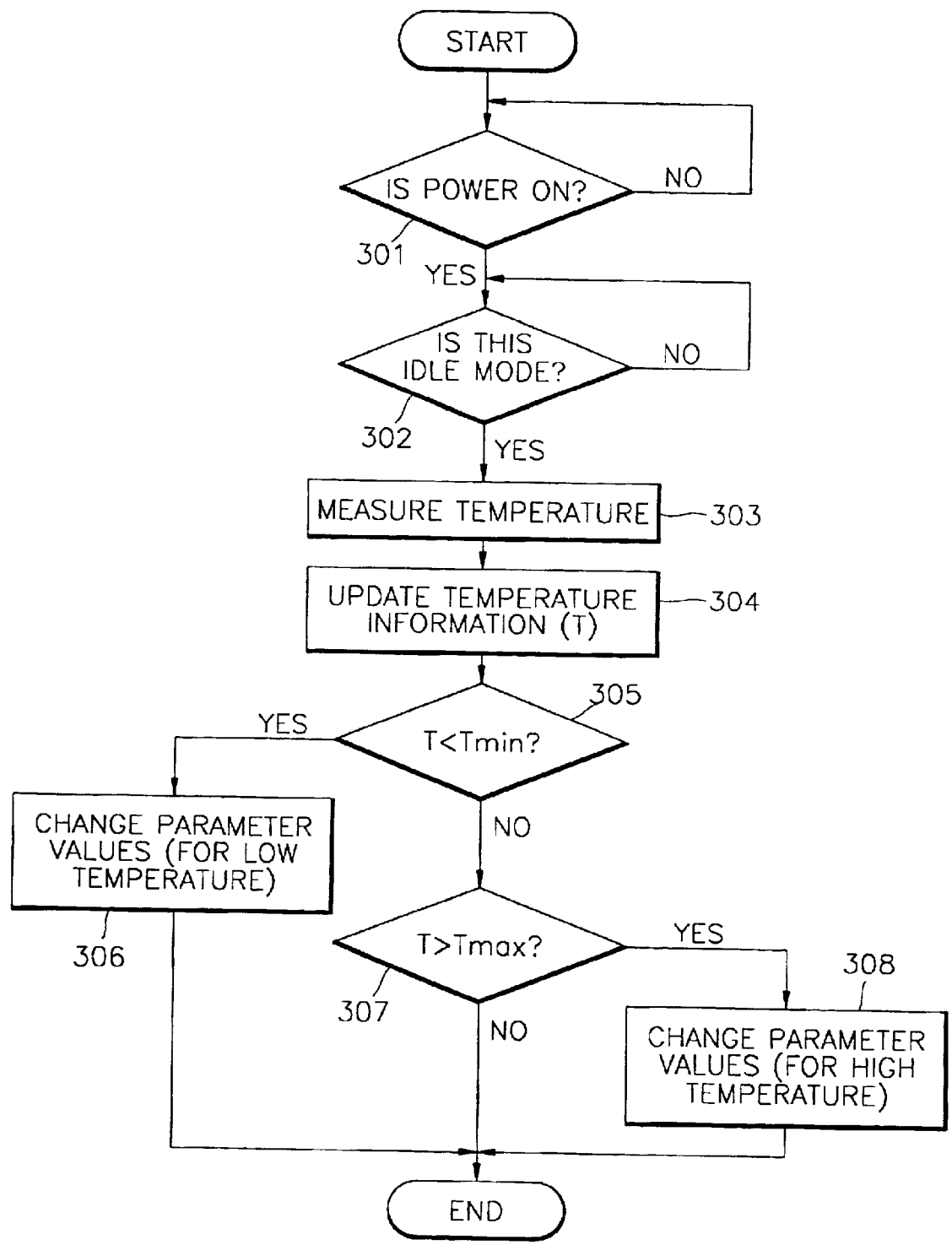
FIG. 3 is a flowchart illustrating one process for determining parameters of the disk drive in accordance with ambient temperature, constructed as a first embodiment of the principles of the present invention.

In one technique for adjusting disk drive parameters in accordance with ambient temperature in the first embodiment of the present invention, as shown in FIG. 3 controller 206 determines whether the hard disk drive is in power-on mode (step 301). When the hard disk drive is in power-on mode, controller 206 determines if the present mode corresponds to the idle mode (step 302). The idle mode is an idle state of operation in which execution of an input command has been terminated and reception of a new user command is awaited by hard disk drive 10. If the hard disk drive is in the idle mode, temperature sensor 207 perceives the temperature in the hard disk drive and generates temperature information corresponding to that perceived temperature (step 303). The temperature sensor 207 may be either arranged to be constructed either independently of other constitutional elements or be included within the monolithic structure of the module for preamp 203.

Next, controller 206 updates the temperature information T stored in memory 208 with the temperature information generated by temperature sensor 207 at regular intervals exhibiting a predetermined period, e.g. a period of ten minutes, during the idle mode (step 304). Then, controller 206 compares the updated temperature information T and the lower limit of temperature information $T_{min}$ for the critical temperature range, which is established during the burn-in process (step 305). When the updated temperature information T is determined during step 306 to have a lower value than the lower limit temperature information $T_{min}$, controller 206 updates parameters related to the read bias current factor and parameters for writing including the write current determination factor, the write booster determination factor and the write precomp factor among other parameters that are stored in the memory 208 and that are substantially affected by temperature change, to values that compensate for the lower updated temperature information. At this time, values of these parameters maybe adjusted by controller 206 in order to adjust the performance and operation of disk drive 10 by, for example, adding corrected values that are statistically calculated through experiments at the corresponding lower temperature and stored in memory 208.

On the other hand, when the updated temperature information T is either equal to or greater than the lower limit of temperature information $T_{min}$, controller 206 goes to step 307 and compares the updated temperature information T and the upper limit of temperature information $T_{max}$ of the critical temperature range established during the burn-in process, and updates the values of parameters stored in memory 208 that are related to the read bias current factor and parameters for writing, including the write current determination factor, the write booster determination factor and the write precomp factor among other parameters stored in memory 208 that are substantially affected by temperature change, to compensate for the higher temperature when the updated temperature information T has a value that is determined in step 308 to be larger than that of the upper limit of temperature information $T_{max}$.

The parameter values stored in memory 208 need not be updated in the event that the updated temperature information T falls within the critical temperature range, that is, the updated temperature information T is greater than or equal to the lower limit of the temperature information $T_{min}$ and is less than or equal to the upper limit of the temperature information $T_{max}$.

Figure 4:
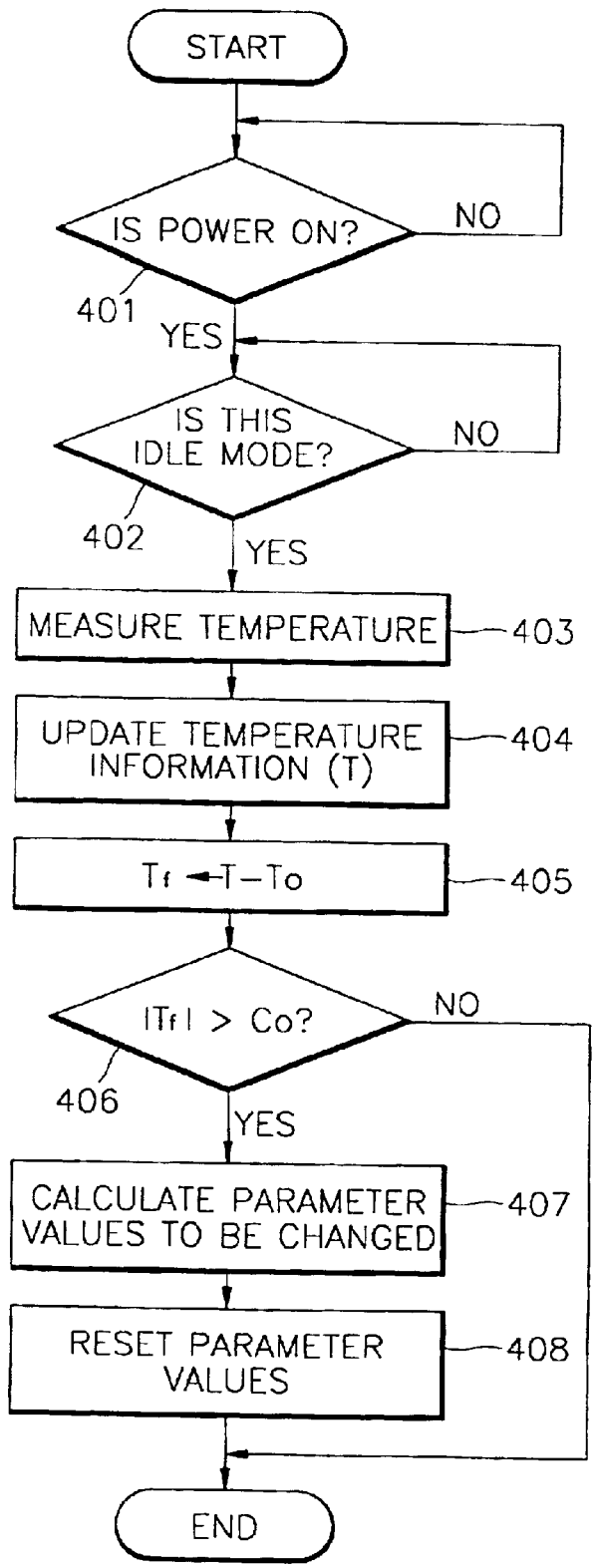
FIG. 4 is a flowchart illustrating another process for determining parameters of the disk drive in accordance with ambient temperature, constructed as a second embodiment of the present invention.

In the method of another technique for adjusting disk drive parameters in accordance with ambient temperature according to another embodiment of the present invention, as shown in FIG. 4 controller 206 determines during step 401 whether hard disk drive 10 is in a power-on mode. When the hard disk drive is in a power-on mode, controller 206 determines during step 402 whether the present mode of operation of hard disk drive 10 corresponds to the idle mode. If the hard disk drive is in its idle mode, temperature sensor 207 senses the ambient temperature in the hard disk drive and in step 403 generates temperature information corresponding to that sensed temperature. Then, in step 404 controller 206 updates the temperature information stored in memory 208 with the temperature information generated by temperature sensor 207 at regular intervals having a predetermined period during the idle mode. Next, in step 405 controller 206 obtains a temperature difference $T_f$ by subtracting the temperature information $T_0$ established during the burn-in process, which is read from memory 208, from the updated temperature information T corresponding to ambient temperature in hard disk 10. After making a comparison during step 406 of the absolute value of the temperature difference $T_f$ and a tolerance $C_0$, the parameter values stored in memory 208 are not updated when the absolute value of the subtracted temperature information $T_f$ is less than or equal to the tolerance $C_0$, because this indicates that the present temperature condition is similar to the temperature condition established during the burn-in process.

The "tolerance $C_0$" refers to the maximum amount the temperature can vary from $T_0$ in a burn-in process without having to change the set values of parameters in order to maintain normal performance. That is, the parameter values need not be changed at temperatures within a range of ($T_0-C_0$) to ($T_0+C_0$) in the burn-in process. When the sensed ambient temperature is outside the above temperature range, the parameter values must be adjusted in order to compensate for the temperature variation. The value of $C_0$ is obtained through experimentation.

When the absolute value of the subtracted temperature information $T_f$ is larger than the tolerance $C_0$ however, the parameter values must be adjusted in order to conform to the thermal variation. At this time, the parameters stored in memory 208 that are related to the read bias current factor and the parameters for writing, which include the write current determination factor, the write booster determination factor and the write precomp factor among parameters, which are substantially affected by thermal variation, are changed in step 407 to adapt to the current ambient temperature based on the value of the temperature difference $T_f$ obtained in step 405. The optimum parameter values to compensate for variations in the ambient user temperature can be calculated by substituting the temperature difference $T_f$ for a parameter-operational expression which is obtained statistically through simulation. In step 408, the parameter values stored in memory 208 are changed to correspond to those obtained in step 407.

In the above-described exemplars of embodiments of the principles of the present invention, parameters that are markedly affected by temperature are enumerated as parameters for writing including the write current determination factor, the write booster determination factor and the write precomp factor, and the parameters related to the read bias current factor. Other, read/write parameters such a filter tap determination factor, a filter booster determination factor and a filter blocking frequency determination factor, or a servo parameter can be added to the above-described parameters.

Through these techniques, a variety of parameters that affect the operation and performance of a hard disk drive can be reset to conform to ambient temperature by using the relationship therebetween in accordance with the thermal variation, thus allowing a hard disk drive to operate with optimum performance despite thermal variations in ambient temperature.

The principles of the present invention may be incorporated into a method, apparatus or system. It may be appreciated therefore, that the practice of the present invention endeavors to continuously maintain those environmentally sensitive operational and structural characteristics of a memory such as, by way of example, a hard disk drive, at values that stabilize the performance of the memory to conform to its operational and structural characteristics exhibited while the memory is within a critical range of ambient conditions. If implemented with software, elements constituting the present invention are represented by code segments that execute the necessary operations. The program or code segments may be stored in a processor-readable medium or may be transmitted by a computer data signal that is modulated onto a carrier wave in a transmitting medium or communications network. Any medium that stores or transmits information such as an electric circuit, a semiconductor memory device, a ROM, a flash memory, an erasable ROM, a floppy disk, an optical disk, a hard disk, an optical fiber medium and a radio frequency (RF) network may be used as the processor-readable medium. The computer data signal is a signal that can be transmitted on an electric network channel, optical fiber, air, electric system, radio frequency network and on other media of signal transmission.

In specific embodiments of the present invention, the individual values of the several write and read parameters may be adjusted individually and independently from one another when the controller determines that an ambient environmental condition such as the temperature of the memory apparatus, is outside of the critical range, either by changing the values of these parameters with preset incremental values, by reference to look-up tables indexed by the amount that the ambient temperature exceeds the nearest value of the critical range, or by operation of an equation upon that amount. Alternately, in a different embodiment, several or all of the values of the several write and read parameters maybe adjusted together and en mass, so that the adjustment of one value may reflect the adjustment in value of one or more of the other values of the parameters, so as to simultaneously compensate for both changes in the functional and structural characteristics of the memory device as well as for changes in the values of the other write and read parameters, in order that the operational performance of the memory will faithfully mimic its performance while operating within the critical range. In the foregoing embodiments, temperature was used as an exemplary environment condition that affects the structural and functional characteristics, and thus the operational performance of the memory device.

The foregoing paragraphs describe a method and apparatus that determines disk drive parameters in accordance with ambient temperature, with the values of various parameters affected by temperature being controlled and automatically changed to values corresponding to the changed ambient temperature when an environment where the hard disk drive is installed changes, thereby allowing the hard disk drive to operate with optimal performance. While the present invention has been particularly shown and described with reference to the several embodiments thereof, the present invention is not restricted to those embodiments. Further, it will be understood by those skilled in the art that various changes in form and details may be made without departing from the spirit and scope of the invention as defined by the appended claims.

As described above, according to the present invention, parameter values, which are sensitive to the temperature of a hard disk drive, maybe modified or controlled using the relationship between the values of those parameters and the temperature of the hard disk drive in accordance with the present ambient temperature, thereby preventing any deterioration in the performance of the hard disk drive even when the temperature at the burn-in process and present ambient temperature are different.

What is claimed is:

1. A method of modifying parameters of a hard disk drive in accordance with ambient temperature, comprising the steps of:

updating temperature information by sensing the ambient temperature in a hard disk drive during a particular mode of operation of the hard disk drive;

making a determination that an excessive temperature exists when the updated temperature information falls outside of a critical temperature range; and when the updated temperature information falls outside of said critical temperature range, changing values of a plurality of write and read parameters influencing performance of said hard disk drive that are affected by thermal variation, to compensate for changes in the performance of the hard disk drive due to said excessive temperature, in dependence upon relationships between said write and read parameters and said thermal variation.

2. The method of claim 1, further comprised of applying electrical power to functionally operate said hard disk drive during an idle mode.

3. The method of claim 1, further comprised of updating the temperature information at regular intervals having predetermined periods.

4. The method of claim 1, further comprised of:
assigning to each of said parameters a corresponding standard value;
applying each said standard value during operation of said hard disk drive while the temperature information lies within said critical temperature range;
when the updated temperature information falls below a lower limit of the critical temperature range, changing each said standard value in dependence upon a low-temperature compensation parameter value; and
when the updated temperature information rises above an upper limit of the critical temperature range, changing each said standard value in dependence upon a high-temperature compensation parameter value.

5. The method of claim 1, further comprised of responding to said determination that an excessive temperature exists by determining said values in dependence upon an amount by which the updated temperature information exceeds the critical temperature range.

6. The method of claim 1, further comprised of adjusting one or more of said write and read parameters comprised of a write current determination factor, a write booster determination factor and a write precomp factor, and a read bias current factor, when changing said values of said write and read parameters.

7. The method of claim 1, further comprised of:
changing said values by individually adjusting said values of the plurality of write and read parameters independently from one another when the updated temperature information falls outside of said critical range.

8. The method of claim 1, further comprised of:
changing said values of several of said plurality of write and read parameters together and en mass, with adjustment of each of said values of said several parameters being simultaneously adjusted in dependence upon said excessive temperature and said adjustment of others of said values of said several parameters.

9. An apparatus for determining parameters of a hard disk drive under ambient temperature, comprising:
a memory storing information representing a plurality of parameters that influence performance of said hard disk drive and temperature information representing ambient temperature in the hard disk drive;
a temperature sensor disposed to detect the ambient temperature in the hard disk drive; and
a controller storing in said memory updated temperature information representing the ambient temperature detected by the temperature sensor during a particular operational mode of the hard disk drive, detecting an excessive temperature by comparing the updated temperature information and a critical temperature range and compensating for variations in said performance of the disk drive attributable to the excessive temperature by adjusting values of write and read parameters affected by thermal variation to correspond to the excessive temperature when the updated temperature lies outside of the critical temperature range.

10. The apparatus of claim 9, further comprised of updating said temperature information while said hard disk drive is in an idle mode during a power-on state with electrical power applied to functionally operate the hard disk drive.

11. The apparatus of claim 9, further comprised of said controller updating the temperature information that is detected by the temperature sensor at regular intervals each having a predetermined period.

12. The apparatus of claim 9, further comprised of said controller determining said values corresponding to the excessive temperature in dependence upon an amount by which the updated temperature information exceeds the critical temperature range in accordance with an equation.

13. The apparatus of claim 9, further comprised of said controller determining said values corresponding to the excessive temperature in dependence upon an amount by which the updated temperature information exceeds the critical temperature range.

14. The apparatus of claim 9, further comprised of said memory storing write and read parameters, including a write current determination factor, a write booster determination factor and a write precomp factor, and a read bias current factor.

15. The apparatus of claim 9, further comprised of:
said memory storing for each of said parameters a corresponding standard value; and
said controller:
applying each said standard value during operation of said hard disk drive while the temperature information lies within said critical temperature range;
when the updated temperature information falls below a lower limit of the critical temperature range, changing each said standard value in dependence upon a low-temperature compensation parameter value; and
when the updated temperature information rises above an upper limit of the critical temperature range, changing each said standard value in dependence upon a high-temperature compensation parameter value.

16. The apparatus of claim 9, further comprised of said controller adjusting said values by individually changing said values of the plurality of write and read parameters independently from one another when the updated temperature information falls outside of said critical range.

17. The apparatus of claim 9, further comprised of said controller adjusting said values of several of said plurality of write and read parameters by changing said values of said several parameters together and en mass, with adjustment of each of said values of said several parameters being simultaneously changed in dependence upon said excessive temperature and changes of values of others of said several parameters.

* * * * *